United States Patent
Ugur et al.

(10) Patent No.: US 10,070,128 B2
(45) Date of Patent: Sep. 4, 2018

(54) INTRA PREDICTION PROCESSOR WITH REDUCED COST BLOCK PARTITIONING AND REFINED INTRA MODE SELECTION

(71) Applicant: NGCodec Inc., Sunnyvale, CA (US)

(72) Inventors: Kemal Ugur, Istanbul (TR); Alberto Duenas, Mountain View, CA (US)

(73) Assignee: NGCodec Inc., Sunnyvale, CA (US)

( * ) Notice: Subject to any disclaimer, the term of this patent is extended or adjusted under 35 U.S.C. 154(b) by 139 days.

(21) Appl. No.: 15/146,790

(22) Filed: May 4, 2016

(65) Prior Publication Data
US 2016/0330445 A1    Nov. 10, 2016

Related U.S. Application Data (60) Provisional application No. 62/157,916, filed on May 6, 2015.

(51) Int. Cl.
| | | |
|---|---|---|
| *H04N 19/11* | (2014.01) | |
| *H04N 19/176* | (2014.01) | |
| *H04N 19/119* | (2014.01) | |
| *H04N 19/147* | (2014.01) | |

(52) U.S. Cl.
CPC ........... *H04N 19/11* (2014.11); *H04N 19/119* (2014.11); *H04N 19/147* (2014.11); *H04N 19/176* (2014.11)

(58) Field of Classification Search
CPC .... H04N 19/11; H04N 19/119; H04N 19/147; H04N 19/176
USPC .................................................... 375/240.03
See application file for complete search history.

(56) References Cited

U.S. PATENT DOCUMENTS

| | | | | |
|---|---|---|---|---|
| 5,864,554 A | * | 1/1999 | Rostoker | G06F 13/128 348/E5.002 |
| 2003/0016754 A1 | * | 1/2003 | Gandhi | H04N 19/61 375/240.24 |
| 2012/0183064 A1 | | 7/2012 | Liu et al. | |
| 2012/0287995 A1 | * | 11/2012 | Budagavi | H04N 19/11 375/240.12 |
| 2013/0136174 A1 | | 5/2013 | Xu et al. | |
| 2013/0188703 A1 | | 7/2013 | Liu et al. | |
| 2014/0092974 A1 | * | 4/2014 | Zhou | H04N 19/51 375/240.16 |
| 2014/0092983 A1 | * | 4/2014 | Joshi | H04N 19/176 375/240.18 |
| 2014/0177707 A1 | * | 6/2014 | George | H04N 19/52 375/240.03 |
| 2014/0269901 A1 | * | 9/2014 | Shi | H04N 19/176 375/240.03 |

(Continued)

OTHER PUBLICATIONS

Kim et al, Multi-core based HEVC hardware decoding system (Year: 2014).*

(Continued)

*Primary Examiner* — Shan E Elahi
(74) *Attorney, Agent, or Firm* — Cooley LLP (57) ABSTRACT

A hardware processor has a per block size intra mode processor to perform intra mode searches for best intra modes for different block sizes. A cost processor computes cost values for the different block sizes, where the cost values are based upon at least one of a simplified distortion estimate or a simplified bit rate estimate. A selective block merger processor establishes a final partition of blocks.

19 Claims, 7 Drawing Sheets

(56) References Cited

U.S. PATENT DOCUMENTS

| | | | |
|---|---|---|---|
| 2015/0078440 A1* | 3/2015 | Novotny | H04N 19/60 375/240.03 |
| 2015/0195566 A1* | 7/2015 | Hinz | H04N 19/105 375/240.13 |
| 2016/0007046 A1* | 1/2016 | Chou | H04N 19/13 375/240.02 |

OTHER PUBLICATIONS

Hamidouche et al, Multi-core software architecture for the scalable HEVC decoder (Year: 2014).*

Young, Lee W., International Search Report and Written opinion issued to international patent application No. PCT/US16/29595, dated Jul. 27, 2016, 7 pgs.

* cited by examiner

INTRA PREDICTION PROCESSOR WITH REDUCED COST BLOCK PARTITIONING AND REFINED INTRA MODE SELECTION

CROSS-REFERENCE TO RELATED APPLICATION

This application claims priority to U.S. Provisional Patent Application Ser. No. 62/157,916, filed May 6, 2015, the contents of which are incorporated herein by reference.

FIELD OF THE INVENTION

This invention relates generally to video compression. More particularly, this invention relates to an intra (i.e., intra-picture or intra-frame) prediction processor configured for reduced cost block partitioning and refined intra mode selection.

BACKGROUND OF THE INVENTION

Figure 1:
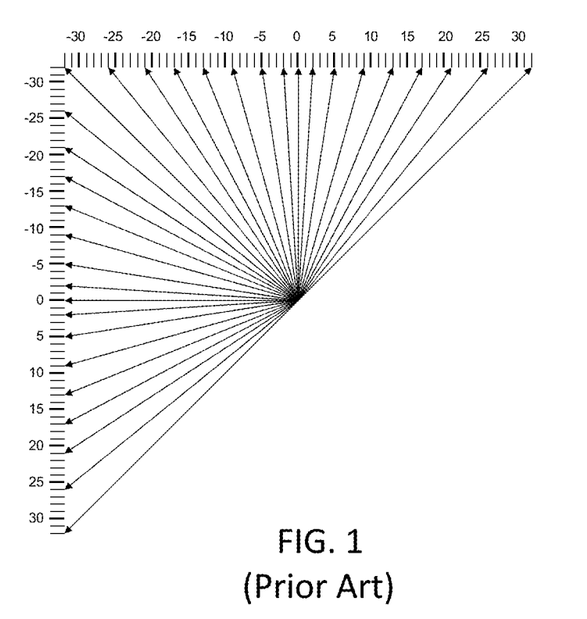
FIG. 1 illustrates prediction angles or intra modes supported by HEVC.

High Efficiency Video Coding (HEVC) is a video compression standard that is the successor of the H.264/AVC video compression standard. HEVC achieves significant improvements for both intra-picture (intra) coding and inter-picture (inter) coding over H.264/AVC. For the case of intra coding, the main differences between HEVC and H.264/AVC are the larger number of directional modes (35 prediction modes instead of 9) and the larger number of block sizes (from 4×4 to 32×32 instead of 4×4 to 16×16). FIG. 1 illustrates the 33 prediction angles used in HEVC. Each prediction angle corresponds to a directional mode or intra mode.

HEVC also supports two additional modes: planar and DC. The angles are defined so that the displacement between the angles is smaller close to horizontal and vertical directions and coarser towards the diagonal directions, as can be seen in FIG. 1.

A typical HEVC encoder performs an intra prediction search to determine the intra mode to be used by the current block. After the best intra mode is selected, the prediction signal for the current block is generated using the pixels of previously processed blocks of the same picture. A residual signal is then formed by taking the difference between the original block and the prediction block, hence spatial redundancies are extracted to reduce the amount of data that needs to be transmitted to represent the picture.

The intra mode of the current block is encoded into a bit stream utilizing a three-entry most probable mode (MPM) list. H.264/AVC uses a single motion vector predictor (unless direct mode is used) and a single MPM. HEVC uses multiple candidate predictors or MPMs together with an index or flag for signaling the selected predictor or MPM, respectively. This list is generated using a process defined in the HEVC standard that utilizes the left and above modes and includes three unique intra modes. If the desired mode is in the list, the index to the list is sent, otherwise the mode is sent explicitly.

Figure 2:
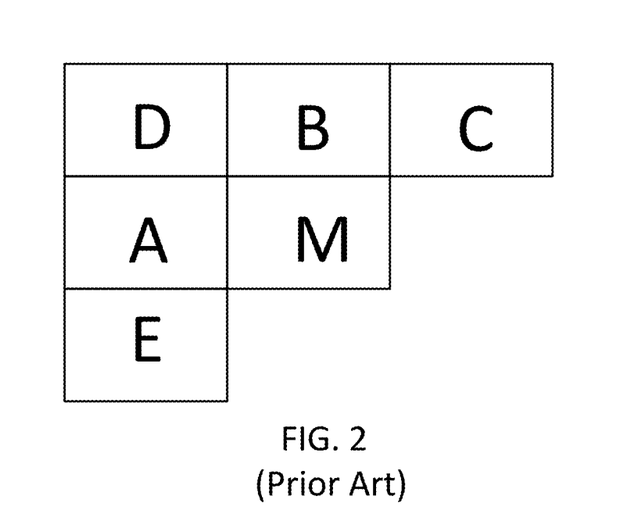
FIG. 2 illustrates intra prediction of block M based, upon previous blocks A, C, B, D and E.
Figure 3:
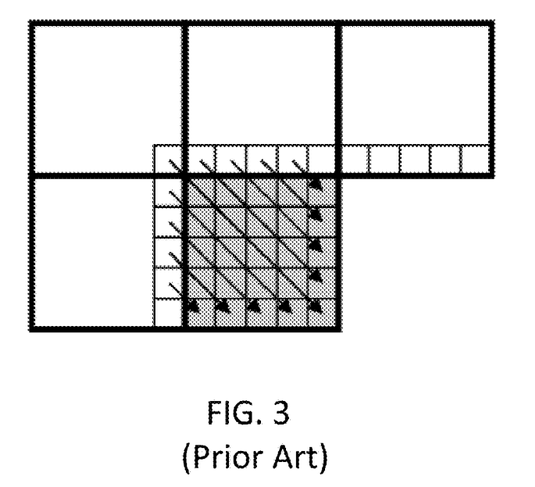
FIG. 3 illustrates adjacent block pixels and offset angles or intra modes used to construct block M.

Referring to FIG. 2, intra prediction is the process of predicting block M from previously processed blocks A, B, C, D and E. As shown in FIG. 3, adjacent pixels and angular offsets (intra modes) from the previously processed blocks are used to construct the reference data that is used to predict M. The basic assumption for intra prediction is that the texture of any block is similar to the texture of adjacent blocks and therefore can be predicted from the adjacent blocks.

In the encoder previous block data needs to be available when performing the full prediction of block M, otherwise there will be a mismatch between the encoder and the decoder, as the decoder uses the reconstructed data from those blocks to reconstruct block M.

In addition to determining the best mode for each block, an HEVC encoder needs to determine the partitioning of the blocks. In HEVC, a Coding Tree Unit (CTU) can be split into smaller blocks in a quad-tree manner. For example, a 64×64 CTU can be first split into 4 32×32 blocks and each 32×32 block can be split further.

Figure 4:
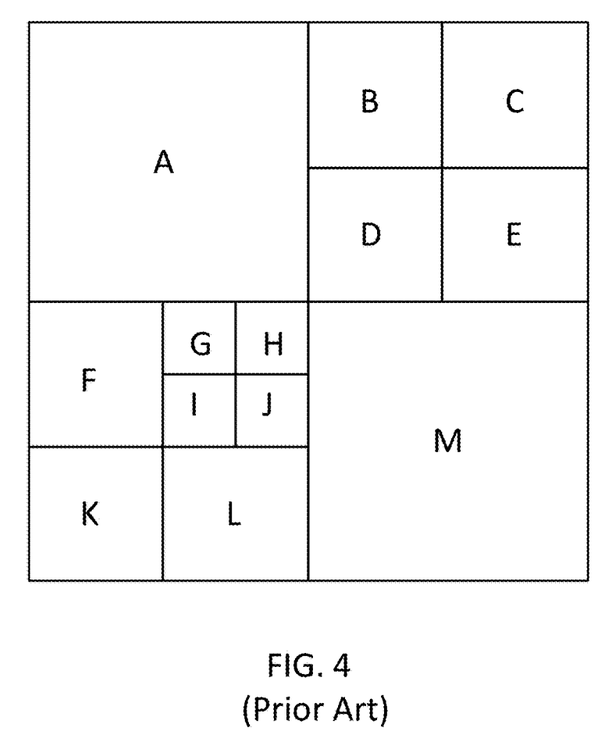
FIG. 4 illustrates a 64×64 block split into smaller blocks.

FIG. 4 illustrates an example splitting of a block, where a 64×64 block is first split into four 32×32 blocks (including displayed blocks A and M). The top-right and the bottom left 32×32 blocks are then split into four 16×16 blocks (e.g., 16×16 blocks B, C, D, E). Furthermore, one of the bottom left 16×16 blocks is split into four 8×8 blocks (i.e., G, H, I, J).

The samples used for prediction determine how the blocks are split. For example, as shown in FIG. 4, the pixels belonging to block H use samples from the neighboring blocks: A, D, E, G, I, K. However, if the blocks G,H,I,J were not split but were a single block of size 16×16, pixels from blocks, A,D,E,F,K would be used for prediction.

Because the distance between the prediction pixel and original pixel is always smaller when smaller block sizes are used, it is generally the case that using smaller blocks yields better predictions. However, it is generally more expensive to code smaller blocks due to the increased overhead associated with transmitting information for the increased numbers of blocks.

For this reason, an efficient algorithm to determine the block partitioning for HEVC is very important. More particularly, it is important to provide a good tradeoff between the accuracy of the prediction and the number of bits used.

SUMMARY OF THE INVENTION

A hardware processor has a per block size intra mode processor to perform intra mode searches for best intra modes for different block sizes. A cost processor computes cost values for the different block sizes, where the cost values are based upon at least one of a simplified distortion estimate or a simplified bit rate estimate. A selective block merger processor establishes a final partition of blocks.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 5:
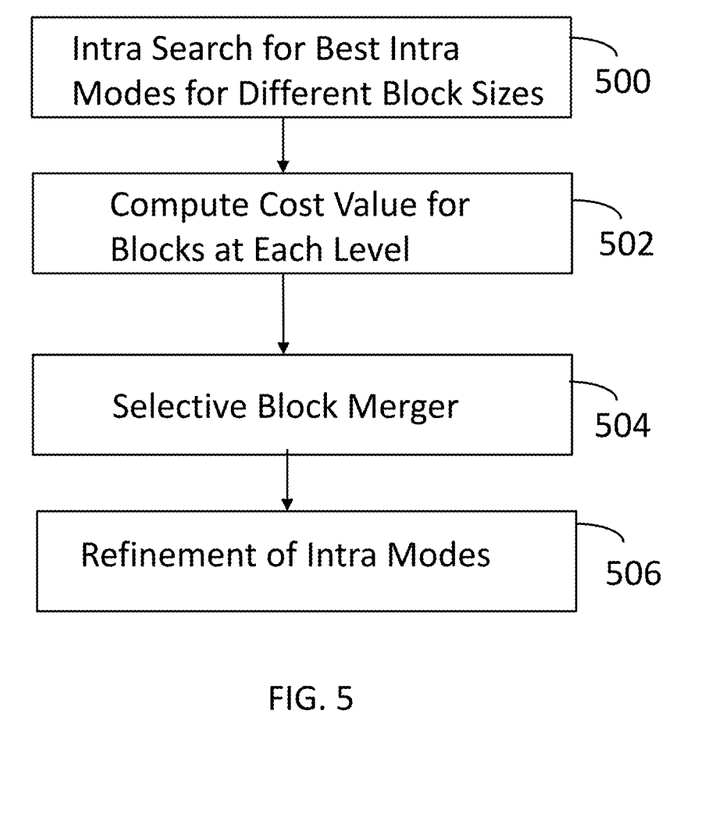
FIG. 5 illustrates processing operations associated with an embodiment of the invention.

FIG. 5 illustrates processing operations associated with an embodiment of the invention. For each block at each candidate size, an intra search process is performed to find the best intra modes for each block size 500. The result of this step is a distortion value for each candidate mode and the best intra mode giving the smallest distortion value. Using these results, a cost value is computed for every block at every candidate block size 502. Using the cost values for the blocks of different sizes, smaller blocks are selectively merged into larger blocks 504. The output of this step is the final block partitioning information for the frame. Using the block partitioning information, intra modes for blocks belonging to the decided partitioning are refined and potentially modified 506. Details associated with each of these operations are as follows.

Figure 6:
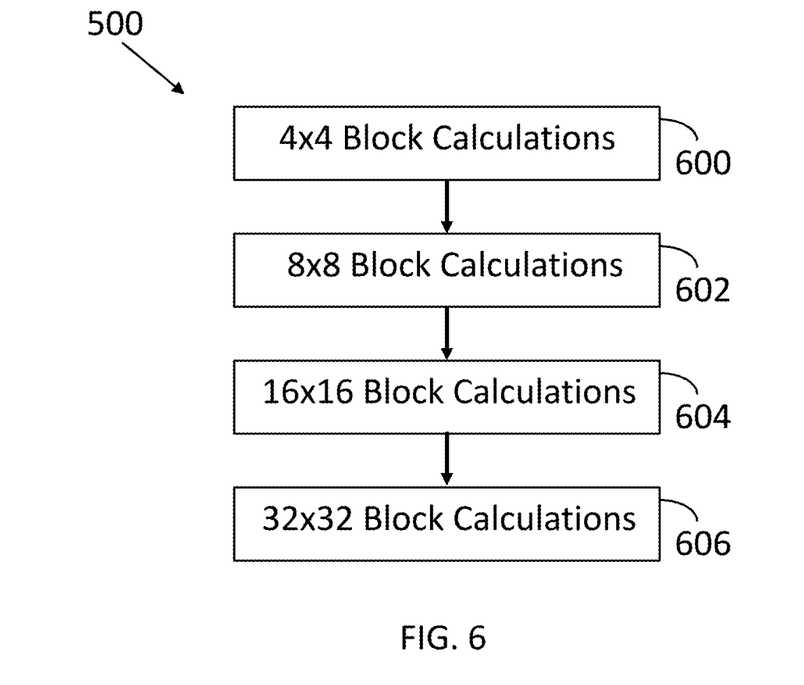
FIG. 6 illustrates progressive block size processing performed in accordance with an embodiment of the invention.

FIG. 6 illustrates processing operations associated with block 500 of FIG. 5. Increasingly larger block size calculations are performed. Each subsequent set of calculations is informed by information gathered in prior calculations. In one embodiment, 4×4 block calculations 600 are performed, followed by 8×8 block calculations 602, followed by 16×16 block calculations 604 and then 32×32 block calculations 606.

More particularly, 4×4 block calculations 600 compute the intra mode for the specified block size (i.e., the best intra-picture prediction mode for the specified block size). Based on these results, intra modes are progressively computed for larger blocks. The 4×4 block calculation 600 may be characterized as including a step 1(a) in which a pre-defined set of intra modes for 4×4 blocks are searched. In a step 1(b) a set of intra modes for 4×4 blocks are searched, where the set depends on the results of Step 1(a). In one embodiment, for step 1(a), the pre-defined set is defined as DC, Horizontal, Vertical and selected diagonal modes (e.g., modes 18 & 34). For step 1(b), the 8 angles closest (+−4) to the best angle found in step 1(a) are searched.

The 8×8 block calculations 602 may be considered the next step. Sets of intra modes for 8×8 blocks are searched, where the sets depend on the results from block 600. The DC, Horizontal, Vertical and selected diagonal angles (e.g., modes 18 & 34) are searched. The best angle and the two closest angles from the smaller block size corresponding to the top-left corner of the block are used.

The 16×16 block calculations 604 may be considered the next step. A set of intra modes for 16×16 blocks is searched, where the set depends on the results from blocks 600 and 602. The DC, Horizontal, Vertical and selected diagonal angles (e.g., modes 18 & 34) are searched. The best angle and the two closest angles from the smaller block size corresponding to the top-left corner of the block are used.

The 32×32 block calculations 606 may be considered a final step. A set of intra modes for 32×32 blocks is searched, where the set depends on the results from each proceeding step. The DC, Horizontal, Vertical and selected diagonal angles (e.g., modes 18 & 34) are searched. The best angle and the two closest angles from the smaller block size corresponding to the top-left corner of the block are used. At this point, angle information is known for every block at every level. In other words, every block at every level has associated candidate intra modes.

In one embodiment, the cost function used to select the best angle or mode is a distortion measure between the reconstructed image and the original pixels. There could be an additional cost parameter if the selected angle is not included in the most probable modes for the given block. The construction of the search set could depend on the bit rate. More particularly, a smaller number of angles could be searched for higher bit rates.

Based on some measure, the construction of the search set could be dynamically updated. For example, if there is a need to dynamically go to a lower complexity operation level, large block sizes could use the same angles found from the smaller block sizes. For blocks 602, 604 and 606 the search set can be constructed using the angles from all four smaller blocks, instead of just using the corresponding top-left corner position. For example, the angle that occurs the most often among the four child blocks could be included in the set. Alternately, two of the angles among the four child blocks and their corresponding neighbors could be included in the set.

All of the processing steps need not be performed. Computation constraints or bit rate requirements may dictate that only a couple of progressive block size calculations be performed. Low frequency data (largely uniform pixels) in large segments of a frame will facilitate larger block size calculations, while high frequency data (largely variable pixels) may reduce the practicality of proceeding to larger block size calculations. An embodiment of the invention adaptively determines the number of block size calculations to perform based upon system parameters and data parameters.

Figure 7:
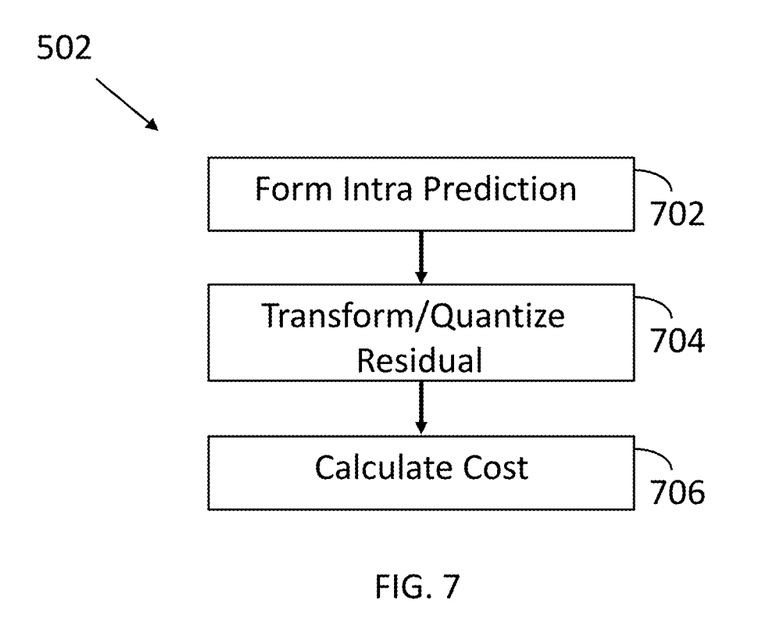
FIG. 7 illustrates cost computations performed in accordance with an embodiment of the invention.

Returning to FIG. 5, next is 502 where a cost value is computed for blocks at each level. These operations are more fully characterized in FIG. 7. Angle information is used to form an intra prediction for a block 702. That is, the processing of FIG. 6, resulted in different block sizes and associated intra modes. An intra prediction is selected based upon this information. Using the prediction and original signal, a residual is formed, which is transformed and quantized 704. The cost is calculated 706 using the quantized transform coefficients of the residual signal.

Figure 8:
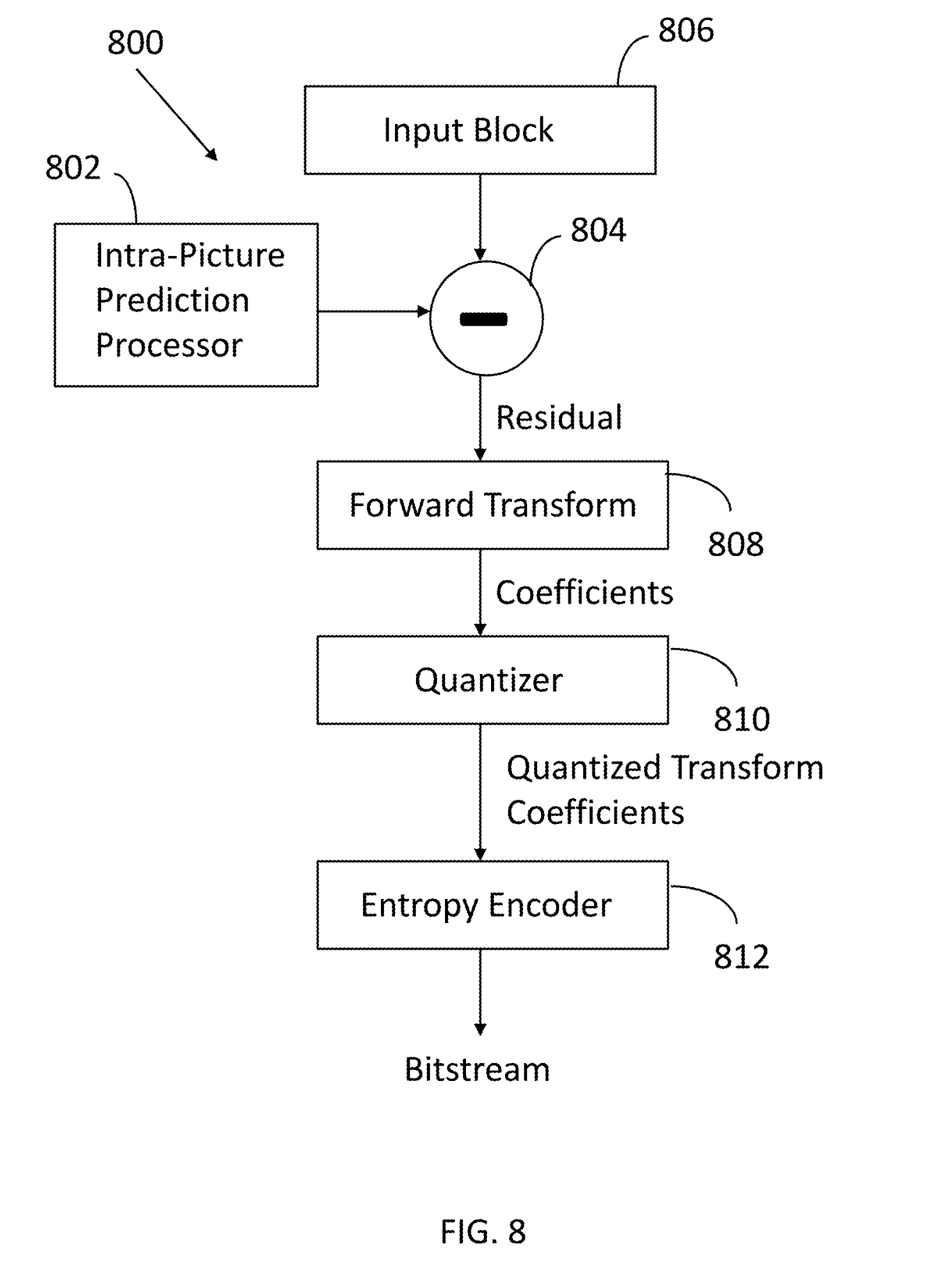
FIG. 8 illustrates an encoder configured in accordance with an embodiment of the invention.

FIG. 8 illustrates an encoder with an intra-picture prediction processor 802 to produce an intra-picture prediction signal that is applied to subtractor 804, which also receives an input block of original pixels 806. The output of the subtractor 804 is a residual signal. The residual signal is divided into square blocks of size N×N where N=$2^M$ and M is an integer. Each residual block is input to a two-dimensional N×N forward transform block 808. The two-dimensional transform can be implemented as a separable transform by applying an N-point one-dimensional transform to each row and each column separately. The resulting N×N transform coefficients are then applied to a quantizer 810 to obtain quantized transform coefficients. The quantized transform coefficients are applied to an entropy encoder 812, which produces a bit stream.

Embodiments of the invention compute the cost value based upon different implementations of the transform block 808 and quantizer 810. Various embodiments adopt approximation techniques; the approximation techniques provide simplified computations, which allow for more options to be explored for optimal results. This is particularly significant for HEVC, which provides so many encoding options. Thus, embodiments of the invention compute cost values based upon at least one of a simplified distortion estimate or a simplified bit rate estimate. These simplified estimates reduce computational costs for any given computation. As a result, more computations may be performed to identify the optimal tradeoff between the accuracy of the prediction and the number of bits used. The reference to reduced cost block partitioning herein refers to individual computational costs based upon individual estimates. The overall computational cost for configuring any given frame may not be reduced, since more alternative configurations may be explored, but each alternative configuration is based upon a reduced cost parameter (e.g., a simplified distortion estimate or a simplified bit rate estimate).

By way of example, the cost value may be $J_l(x,y)$, where l determines the level of the block (e.g., if block is a 4×4, l is 0; if block is an 8×8 block, l is 1 and so on). In this schema, x,y determines the position of the block within the CTU, starting with 0,0 as the left top corner. This operation is more fully discussed below in connection with FIGS. 9A-9F.

This cost function has several elements that are combined to obtain the overall cost of encoding each block at each level. The main elements that contribute to the cost are the number of bits and the distortion of the reconstructed image. Rate distortion optimization seeks to find the lowest distortion (loss of video quality) at the lowest bit rate. The highest quality image will be associated with a high bit rate. However, at some point the additional bits associated with the high bit rate provide comparatively little quality benefit. That is, the extra quality is not worth the expense of the extra bits. A common approach to rate distortion optimization is to multiply the bit cost by the Lagranian, which is a value representing the relationship between bit cost and quality for a particular quality level. The deviation from the source is usually measured as the mean squared error in order to maximize the peak signal to noise ratio video quality metric.

The cost function can be weighted with a lambda parameter to adjust the rate-distortion trade-off. The lambda parameter may depend on the quantization parameter used to code the sequence. In a two-dimensional plot of image quality (Y-axis) as a function of bit rate (X-axis), the image quality curve typically rises quickly and then flattens out. The lambda parameter is a measure of the slope at the optimal quality/bit rate position on the image quality curve. In one embodiment, the equation to calculate the cost may be expressed as follows:

$J_l(x,y)$=estimation of the distortion of the reconstructed image+lambda parameter*estimation of the number of bits The number of bits can be estimated by first using the prediction and original signal. As shown in FIG. 8 a residual signal is formed from the prediction 802 and input block 806. This signal is then applied to a transform block 808 with the resultant quantization coefficients being applied to a quantizer 810. The cost is calculated using the quantized transform coefficients of the residual signal and estimating the number of bits and the distortion of the reconstructed image.

In one embodiment, to estimate the number of bits the cost function includes at least a term that is calculated by counting the number of non-zero coefficients of the quantized and transformed residual signal for the corresponding block at level l, at position x,y.

In one embodiment, the forward transform block 808 is configured to generate an approximation of the actual transform. For example, instead of using a Discrete Sine Transform, a Discrete Cosine Transform may be used. Alternatively, an even lower complexity transform may be used, such as a Hadamard transform.

In another embodiment, the forward transform block 808 utilizes samples with lower bit precision. Another lower complexity alternative is to use a transform with coefficients that are easier to implement, such as requiring smaller numbers of multiplications and additions.

In another embodiment, the forward transform block 808 is omitted. That is, the residual signal is directly applied to the quantizer 810 and non-zero coefficients of the quantized residual signal are counted. This approach is possible because HEVC allows for a transform bypass for small block sizes. Leveraging this option may improve coding efficiency.

In another embodiment, the forward transform block 808 is configured to estimate the number of non-zero coefficients, instead of counting the number of non-zero coefficients. For example, only a subset of coefficients may be used (e.g., half of the coefficients within the transform block) to estimate the total non-zero coefficients of the block.

In another embodiment, the forward transform block 808 is configured to perform more advanced calculations. For example, in addition to counting a number of non-zero coefficients, the forward transform block may also count a number of coefficients greater than 1, greater than 2 and so on. This way the entropy encoding of the block can be mimicked better and more accurate estimations can be performed as this is closer to the way the information will be processed by the entropy encoder 812 and will lead to a greater accuracy on the estimation of the number of bits compared with the actual number of bits being used after the entropy encoding process is performed.

In another embodiment, the lambda parameter used to weight different terms within the cost function can be adjusted dynamically based on the results from the previous blocks or previous pictures or depending on the characteristics of the video that it is being processed.

In another embodiment, additional terms are included to compensate for the overhead of transmitting smaller blocks. For example, when compared to transmitting a single 8×8 block, transmitting four 4×4 blocks would include coding four intra mode information (compared to a single one). This term could be weighted depending on the value of a quantization parameter (QP).

Figure 10:
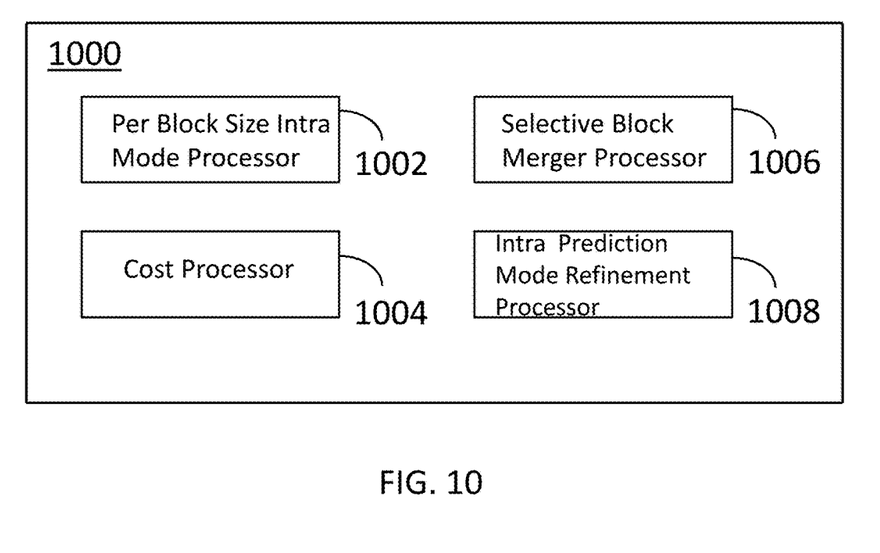
FIG. 10 illustrates a semiconductor configured to implement disclosed operations.

To estimate the distortion 1002, the cost function could include a term that is calculated by taking a difference between the quantized and non-quantized transform coefficients to estimate the distortion of the reconstructed image.

Embodiments of the invention compute the distortion term in different ways. For example, instead of using the difference between quantized and non-quantized transform coefficients, distortion could be calculated based on the prediction error of the block, without undergoing any transform operation. When the video is encoded using non-flat quantization matrices, flat quantization matrices can be used to calculate the distortion. Instead of taking the distortion between each coefficient, distortion between a subset of blocks can be computed and the total distortion of the block can later be extrapolated from that data.

Figure 9A:
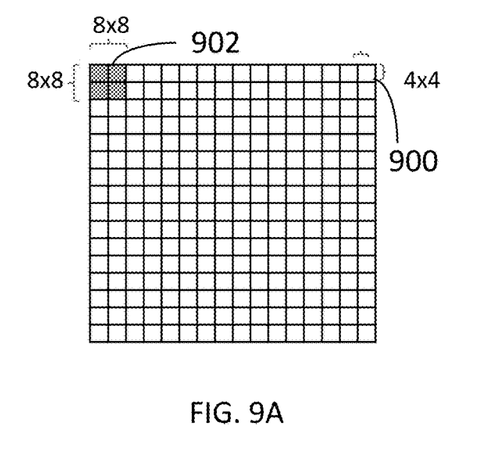
FIGS. 9A-9F illustrate block split selection performed in accordance with an embodiment of the invention.
Figure 9B:
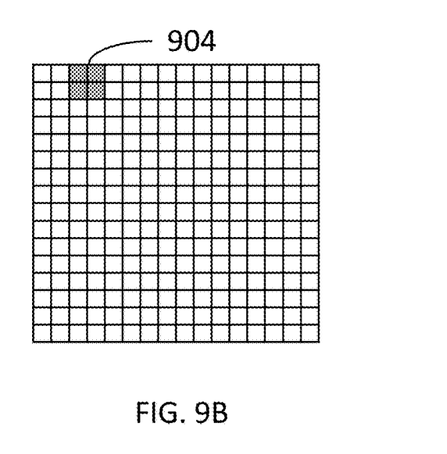
Figure 9C:
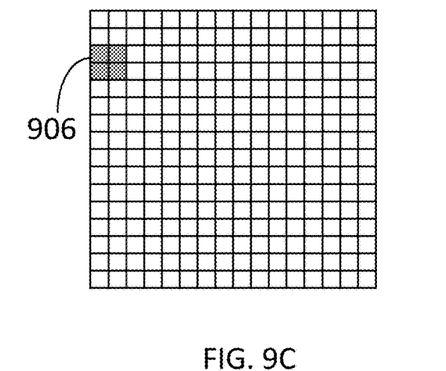
Figure 9D:
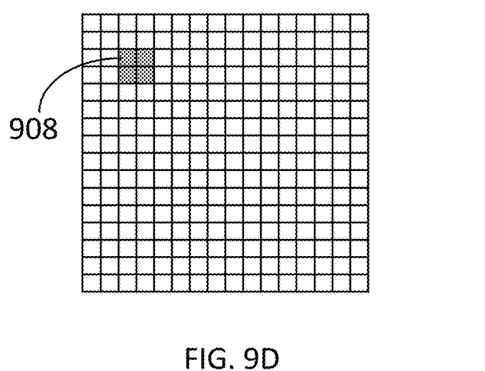
Figure 9E:
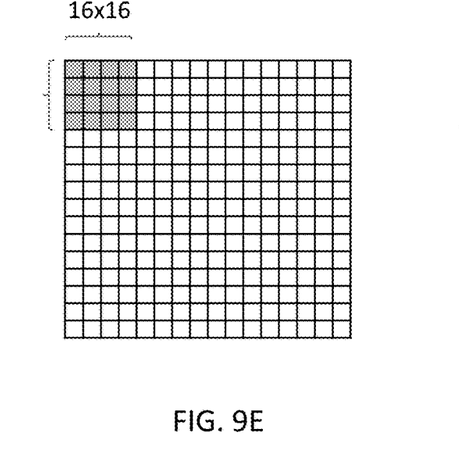
Figure 9F:
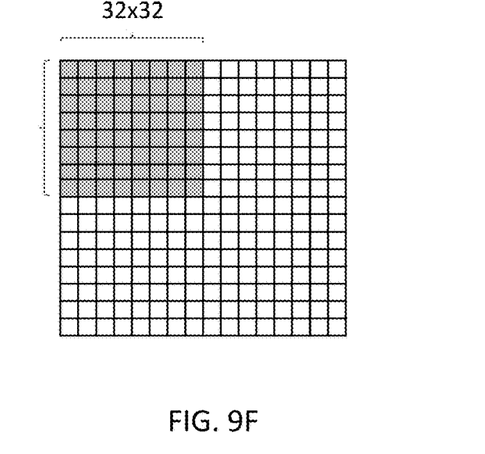

Returning to FIG. 5, the next operation is selective block merger 504. For example, starting from a block size of 8×8, decide whether to merge the smaller blocks into large blocks by at least using the cost function calculated in block 502. Consider the example of FIG. 9A. Each block 900 in FIG. 9A represents a 4×4 block. Consider the case where the algorithm is deciding whether to merge four 4×4 blocks into an 8×8 block. This may be done at indexes (0,0) (902 in FIG. 9A), (0,1) (904 in FIG. 9B), (1,0) (906 in FIG. 9C), (1,1) (908 in FIG. 9D). Similar decisions may be made for 16×16 blocks, as shown in FIG. 9E and 32×32 blocks, as shown in FIG. 9F.

The cost functions may be calculated as follows:

$J_{8 \times 8} = J_1(0,0)$; where $J_1(0,0)$ refers to the cost function for the 8×8 block and it is calculated by using the estimated number of bits and distortion as described above.

$J_{4 \times 4} = J_0(0,0) + J_0(0,1) + J_0(1,0) + J_0(1,1)$ where $J_0(0 \ldots 1, 0 \ldots 1)$ are the corresponding cost functions for each one of the 4×4 blocks and they are calculated by using the estimated number of bits and distortion as described above.

If the cost for coding the 8×8 area with 4×4 blocks (given by $J_{4 \times 4}$) is found to be smaller than using a single 8×8 block (given by $J_{8 \times 8}$) then the corresponding area is split into four 4×4 blocks.

Consider the case of a 32×32 block divided into 16×16, 8×8 or 4×4 blocks. For each set of four 4×4 blocks, a decision is made to combine those into a single 8×8 block or keep it as individual 4×4 blocks. After this, some blocks are combined into 8×8 blocks and some are still maintained as 4×4 blocks. Afterwards, for each 8×8 block a decision is made whether to combine the underlying blocks into a 16×16 block. Underlying blocks could be all 4×4 blocks, all 8×8 blocks or some 4×4 blocks and some 8×8 blocks, depending on the results of the previous step. Similarly, a decision is made for a 32×32 area. In particular, a decision is made whether to combine the underlying blocks into a single 32×32 block.

Returning to FIG. 5, the final operation is refinement of the intra modes 506. The intra modes are refined based on the results of the selective block merger 504. As previously discussed, the block size determines which adjacent pixels are used for an intra prediction. For example, after a partition of information for the CTU is decided, then the cost for transmitting intra modes are known more accurately due to the most probable mode list mechanism in HEVC. This is because constructing the most probable mode list requires knowing the neighboring blocks intra mode information and that is only available after the block partitioning is calculated for the CTU.

In one embodiment, the cost for each intra mode is re-calculated utilizing the most probable mode candidate list and a different intra mode can be used for a block. More specifically, the modes that are part of the most probable mode list would be favored as those take fewer bits compared to coding modes that are not part of the most probable mode list.

In another embodiment, the chroma modes are never modified in this refinement step. That is, only the luma modes are modified. In another embodiment, the chroma modes are searched again when it is found that the luma mode for the given block is changed.

The disclosed operations are implemented in hardware. In particular, an application specific integrated circuit (ASIC), field-programmable gate array (FPGA) or similar hardware architecture is utilized to implement the disclosed operations. FIG. 10 illustrates a semiconductor substrate 1000 with a per block size intra mode computer 1002 to implement the operations of block 500 of FIG. 5.

The semiconductor 1000 also includes a cost computer 1004 to implement the operations of block 502 of FIG. 5, a selective block merger processor 1006 is configured to implement the operations of block 504 of FIG. 5 and finally an Intra Prediction Mode Refinement Processor 1008 is configure to implement block 506 of FIG. 5. Additional resources associated with semiconductor 1000 may be used to implement a fully functional encoder, such as shown in FIG. 8.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A hardware encoder implemented in a semiconductor, comprising:
a first block size intra mode processor to perform first intra mode searches for best intra modes for the first block size, a second block size intra mode processor to perform second intra mode searches for best intra modes for the second block size, wherein the second block size is larger than the first block size, a third block size intra mode processor to perform third intra mode searches for best intra modes for the third block size, wherein the third block size is larger than the second block size;
a cost processor to compute cost values for the first block size, the second block size and the third block size, wherein the cost values are based upon at least one of a simplified distortion estimate utilizing an approximation technique or a simplified bit rate estimate utilizing an approximation technique; and
a selective block merger processor to establish a final partition of blocks including the first block size being merged into the second block size or the third block size.

2. The hardware encoder of claim 1 wherein the simplified distortion estimate is based upon the difference between quantized and non-quantized transform coefficients.

3. The hardware encoder of claim 1 wherein the simplified distortion estimate is based upon a prediction error signal that is not subject to a forward transform.

4. The hardware encoder of claim 1 wherein the simplified distortion estimate is based upon sampled values.

5. The hardware encoder of claim 1 wherein the simplified bit rate estimate is based upon processing of quantized transform coefficients of a residual signal.

6. The hardware encoder of claim 5 wherein the processing of quantized transform coefficients includes counting the number of non-zero coefficients.

7. The hardware encoder of claim 5 wherein the processing of quantized transform coefficients includes counting the number of non-zero coefficients whose magnitude is greater than one and the number of coefficients whose magnitude is greater than two.

8. The hardware encoder of claim 5 wherein the processing of quantized transform coefficients includes operating on a selected subset of a quantized coefficient block.

9. The hardware encoder of claim 5 wherein the transform used to obtain the quantized transform coefficients is a low complexity approximation of the High Efficiency Video Coding transform.

10. The hardware encoder of claim 1 wherein the simplified distortion estimate is based upon a single dimension of a two dimensional quantization matrix.

11. The hardware encoder of claim 1 wherein the cost values are further based upon a weighted term within a cost function.

12. The hardware encoder of claim 11 wherein the weighted term is a measure of the slope at an optimal quality/bit rate position on an image quality curve.

13. The hardware encoder of claim 1 further comprising an intra prediction mode refinement processor to select final intra modes based upon the final partition of blocks.

14. The hardware encoder of claim 13 wherein the intra prediction mode refinement processor selects final intra prediction modes based upon an intra mode cost computation utilizing a most probable mode candidate list.

15. The hardware encoder of claim 13 wherein the intra prediction mode refinement processor selects final prediction modes solely from luma modes.

16. The hardware encoder of claim 13 wherein the intra prediction mode refinement processor is configured to search chroma modes in response to the identification of a change in a luma mode.

17. The hardware encoder of claim 1 wherein the cost processor dynamically adjusts a lambda parameter used to weight different terms within a cost function.

18. The hardware encoder of claim 17 wherein the cost processor dynamically adjusts the lambda parameter based upon at least one of a previous block, a previous picture and characteristics of the video being processed.

19. The hardware encoder of claim 1 wherein the per block size intra mode processor dynamically updates an intra mode search set.

* * * * *